United States Patent
Watterodt et al.

[11] Patent Number: 6,117,040
[45] Date of Patent: Sep. 12, 2000

[54] MULTI-SPEED WHEEL HUB FOR AUTOMOTIVE VEHICLES

[75] Inventors: Thorsten Watterodt, Beaumont; Glen Walter Staheli, St. Albert, both of Canada

[73] Assignee: 792049 Alberta Ltd., Edmonton, Canada

[21] Appl. No.: 09/289,724

[22] Filed: Apr. 12, 1999

[51] Int. Cl.[7] ............................................. F16H 3/48
[52] U.S. Cl. .................... 475/299; 475/298; 475/138
[58] Field of Search ................................ 475/138–142, 475/297–299

[56] References Cited

U.S. PATENT DOCUMENTS

| | | | |
|---|---|---|---|
| 4,083,421 | 4/1978 | Van Horn et al. | 475/269 X |
| 4,569,252 | 2/1986 | Harper | 475/299 |
| 4,611,506 | 9/1986 | Groothius | 475/138 |
| 4,782,722 | 11/1988 | Powell | 475/295 X |
| 5,362,081 | 11/1994 | Beidler et al. | 475/297 X |
| 5,478,290 | 12/1995 | Buuck et al. | 475/140 |
| 5,525,115 | 6/1996 | Vanzini | 475/146 |
| 5,908,080 | 6/1999 | Bigley et al. | 180/247 |

*Primary Examiner*—Khoi Q. Ta
*Attorney, Agent, or Firm*—Foley & Lardner

[57] ABSTRACT

A novel multi-speed wheel hub having a housing, an input member, including a sun gear, disposed in the housing, a planet carrier, including a plurality of planet gears, disposed about the sun gear. There is also a ring gear disposed about the planet gears. The multi-speed wheel hub includes a shifting system including a piston. A first shift ring is mechanically coupled to the piston by a plurality of first push rods and a second shift ring is mechanically coupled to the first shift ring by a plurality of second push rods. The piston activates the first and second shift rings, such that, when the first shift ring is engaged and the second shift ring is disengaged, the ring gear is locked to the housing so that a torque is transmitted from the sun gear through the planet carrier to the wheel. When the first shift ring is disengaged and the second shift ring is engaged, the ring gear is unlocked from the stationary member and the planet carrier is locked to the input member so that torque is transmitted from the sun gear to the wheel. A return spring may also be provided to return the shifting system to its initial position.

16 Claims, 5 Drawing Sheets

MULTI-SPEED WHEEL HUB FOR AUTOMOTIVE VEHICLES

BACKGROUND OF THE INVENTION

1. Field of the Invention

The invention relates to a novel multi-speed wheel hub, specifically, a multi-speed wheel hub for use on vehicles travelling both off-road and on-road. More particularly, the invention relates to a novel multi-speed wheel hub having a planetary gear, a ring gear, and a shifting system including two shift rings and a piston for activating the two shift rings. The multi-speed wheel hub is suitable for use on, for example, construction vehicles, passenger cars, mass transportation vehicles, agricultural vehicles, military vehicles, trucks, tractors, logging trucks, oil field equipment, and the like.

2. Description of Related Art

There are a number of known wheel hubs currently used on automotive vehicles. One such wheel hub does not employ a planetary gear system. In this embodiment, when the vehicle is operating under a heavy load during an off-road application, all of the torque at the wheels is transmitted through the entire drive train of the vehicle, which greatly reduces the life of the drive train components. There are no other options for transmitting this torque in this device. With this alternative, it is extremely difficult to obtain smooth acceleration, particularly in off-road applications.

Moreover, this known alternative requires extreme care when pulling a heavy load because it is very easy to break a drive shaft or damage the differential due to the resultant large loads borne by these components. Some manufacturers have compensated by increasing horsepower and installing larger drive shafts, differentials, and other drive components. Manufacturers are trying to provide an axle of great strength while being able to provide the required speed. These solutions add both weight and cost to the assembly.

Another alternative employs a planetary gear system with the planetary gear system working at all times. This alternative, the full-time planetary gear alternative, is very effective for off-road applications. When operating on-road at highway speeds, however, the planet gears generate large amounts of heat because they are turning at very high speeds. As a result, very high quality gears and bearings are necessary, which results in greater manufacturing costs. Because of the great heat generated by the rotating planet gears, this full-time planetary gear alternative must be equipped with expensive cooling and lubricating systems.

There is also a third alternative disclosed in U.S. Pat. No. 5,478,290 to Buuck, et al., which is a two-speed high shift transmission. The '290 patent discloses a hydraulically controlled two-speed transmission residing primarily within a rotatable wheel hub including a hydraulically operable piston and intermediate member to control two clutches in a first planetary gear set. The first planet carrier includes a gear that drives a second planetary gear set, which results in the rotation of the wheel hub. When hydraulic pressure is applied to the piston and an intermediate member, the first clutch is engaged, which locks an inner ring gear to a stationary outer ring gear, thereby effecting a high ratio reduction. When no hydraulic pressure is applied to the piston and the intermediate member, a second clutch engages the first sun gear and the first planet carrier locking them together so that the first sun gear, first planet gear, first planet carrier, and the inner ring gear rotate in unison together thereby effecting a low ratio reduction. This alternative, however, does not allow for a direct drive ratio (1:1). Moreover, the obtainable drive ratios will not allow the vehicle to travel at the desired highway speed. Last, the two-speed high shift transmission also has a large number of parts or components, which leads to increased cost and greater opportunity for failure.

These alternatives, both of which employ planetary gear sets, generate large amounts of heat because the planet gears are always turning. Manufacturers currently compensate by using "high speed planetary axles" made from extremely accurate gears and then use an expensive cooling system for cooling the oil used to lubricate the parts. Problems are encountered because of the shorter life of the planetary gear units and the high cost of repairing them.

The difficulties suggested in the preceding are not intended to be exhaustive but are among many tending to reduce the desirability of known wheel hubs. Other noteworthy problems may exist; however, those presented above should be sufficient to demonstrate that such methods and apparatuses appearing in the past will admit to worthwhile improvement.

SUMMARY OF THE INVENTION

Accordingly, it is therefore a general object of the invention to provide a multi-speed wheel hub that will obviate or minimize the difficulties of the type previously described.

It is a specific object of the invention to provide a multi-speed wheel hub that will allow vehicles to travel both off-road and on the highway.

It is another object of the invention to provide a multi-speed wheel hub that allows the vehicle to smoothly accelerate in both off-road and highway conditions.

It is still another object of the invention to provide a multi-speed wheel hub that can be adapted to existing vehicles and/or replace existing hubs.

It is still a further object of the invention to provide a multi-speed wheel hub that does not require costly lubricating and/or cooling systems.

A preferred embodiment of the invention which is intended to accomplish at least some of the foregoing objects includes a housing; an input member, including a sun gear, disposed in the housing; a planet carrier, including a plurality of planet gears, disposed about the sun gear; a ring gear disposed about the planet gears; and a shifting system including: a piston; a first shift ring mechanically coupled to the piston by a plurality of first push rods; and a second shift ring mechanically coupled to the first shift ring by a plurality of second push rods, wherein the piston activates the first and second shift rings; wherein, when the first shift ring is engaged and the second shift ring is disengaged, the ring gear is locked to the housing so that torque is transmitted from the sun gear through the planet carrier to the wheel, and wherein, when the first shift ring is disengaged and the second shift ring is engaged, the ring gear is unlocked from the housing and the planet carrier is locked to the input member so that torque is transmitted from the sun gear to the wheel.

Additional objects and advantages of the invention will be set forth in the following description or may be learned by practice of the invention. The objects and advantages of the invention may be realized and obtained via the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description of the preferred embodiments, serve to explain the principles of the invention, in which.

DETAILED DESCRIPTION OF THE PREFERRED EMBODIMENTS

The invention and the following preferred embodiments may be used for vehicles that travel on and off improved roads, or highways, including, but not limited to, construction vehicles, passenger cars, mass transportation vehicles, agricultural vehicles, military vehicles, trucks, tractors, logging trucks, oil field equipment, and the like. This multi-speed wheel hub may be provided by the original equipment manufacturer or as an after-market replacement for a conventional hub assembly of a driven wheel. The present invention is to be installed in the power train, downstream from the power source, transmission, and differential, at each driven wheel. Thus, a two-wheel drive vehicle would require two of the wheel hubs according to the present invention.

While in the highway mode, the wheel to drive axle ratio is at 1:1, or direct drive. In the off-road mode, the wheel to drive axle ratio would be reduced to approximately 1:3 in a preferred embodiment. This reduces the torque through the drive axle to the clutch by approximately ⅔, thus prolonging component life.

Torque from the differential is received via an input shaft, for example, an axle shaft, supported for relative rotation with respect to a surrounding housing. When the vehicle is on the highway, or any improved road, an axially displaceable collar, or shift ring, engages the end of the input shaft and the wheel hub. Consequently, the entire planetary reduction gear set is locked to the input shaft and torque is transmitted from the input shaft to the wheel hub without reducing the speed.

When the vehicle is being used off-road, the shift ring is axially displaced so as to unlock the input shaft with respect to the wheel hub. At the same time, a second axially displaceable shift ring is moved so as to engage and lock a ring gear and the housing. Torque is transmitted, at a reduced speed, from the input shaft to the vehicle wheel via the planet gears mounted for relative rotation on the wheel hub.

Figure 1:
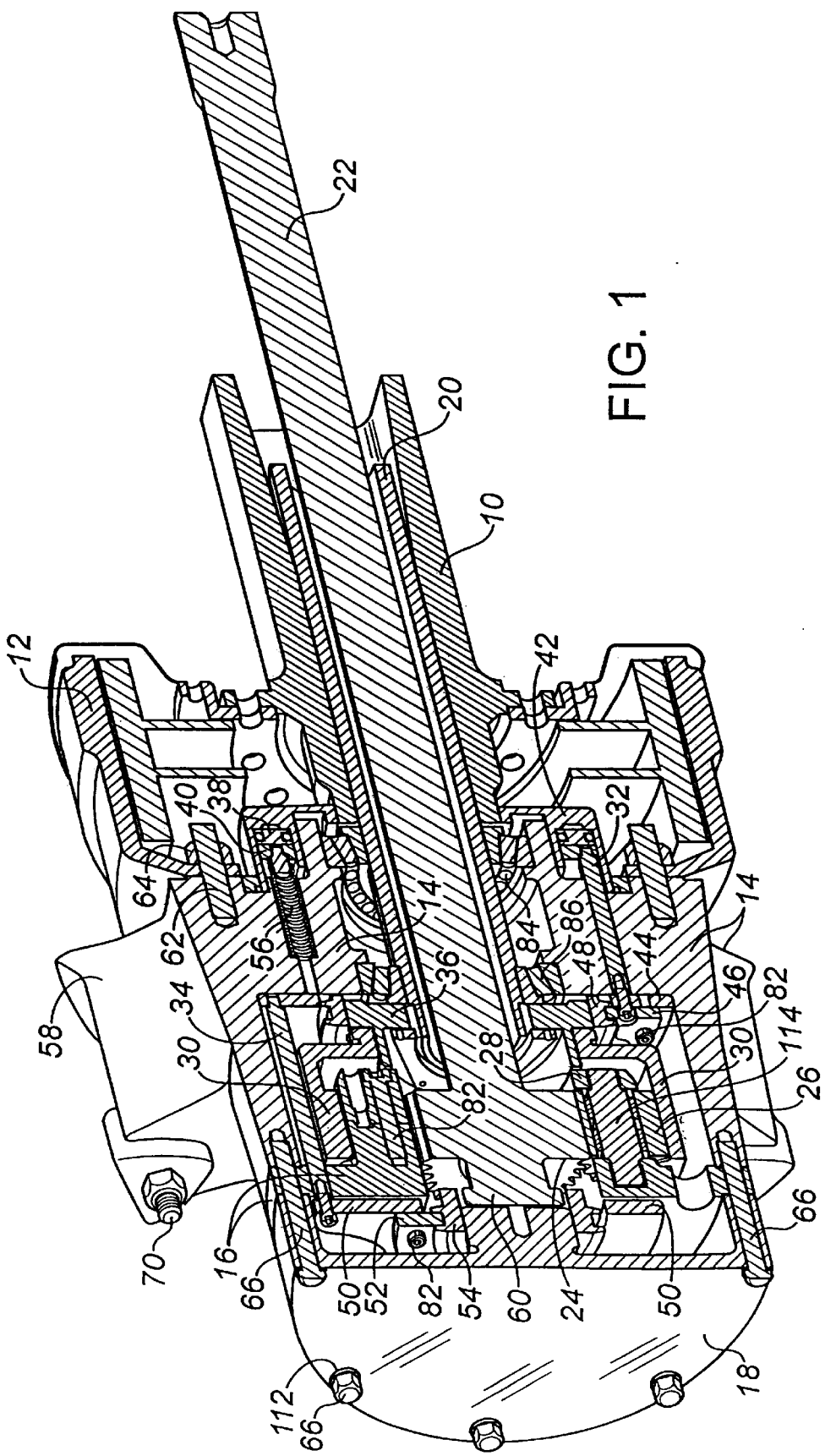
FIG. 1 is a sectioned perspective view of a first embodiment of the invention.

Referring now to the Figures, and initially to FIG. 1, there will be seen a differential housing 10, a brake drum 12, a wheel hub 14, a main planet carrier 16, and an end cap 18, which form the outer portion or housing of the multi-speed wheel hub. The brake drum 12 is mounted to the wheel hub 14, which is coupled to the differential housing 10 and the spindle 20, through which the input member 22 enters the multi-speed wheel hub assembly. A sun gear 24 is integrally formed near the end of the input shaft or drive axle 22. The main planet carrier 16, along with its associated plurality of planet gears 26 and secondary planet carrier 28, is disposed about the sun gear 24. Disposed about the planet gears 26 is a ring gear 30.

The multi-speed wheel hub also includes a plurality of first or inner push rods 32 and a plurality of second or outer push rods 34, preferably, there are three of each of the first and second push rods 32, 34. A stationary spline 36 is mounted to the spindle 20. A piston 38, preferably a ring piston that is pneumatically controlled, and an axial bearing 40 are preferably provided. The piston 38 is disposed within a piston housing 42. When the piston 38 is actuated it pushes on the axial bearing 40, which then acts on the plurality of first push rods 32. The first push rods 32 act on the first or inner shift ring 44. As a result, the first shift ring 44 and the piston 38 are mechanically coupled to each other. The first shift ring 44 preferably includes a plurality of tabs or plates 46 that are coupled to a first or inner shift sleeve 48.

A second or outer shift ring 50 is mechanically coupled to the first shift ring 44 via a plurality of second or outer push rods 34. Each second push rod 34 is connected at one end to the first shift ring 44 and at another end to the second shift ring 50. When the piston 38 is actuated, the axial bearing 40 pushes on the first shift ring 44 through the first push rods 32. The first shift ring 44, in turn, acts on the second shift ring 50 through the second push rods 34. The second shift ring 50 preferably includes second or outer tabs or plates 52 coupled to a second or outer shift sleeve 54. A return spring 56 is also provided to return the system to a highway mode once the off-road mode is no longer desired.

There are alternatives for actuating the shifting sleeves, in addition to the piston 38, push rods 32, 34, shift rings 44, 50, and tabs 46, 52, which include using an air piston with push rods and conventional shifting forks, mechanically using cams and/or linkages with push rods and either shifting rings with tabs or shifting forks, and manually using push rods and either shifting rods with tabs or shifting forks.

The operation of the first embodiment will now be explained with reference to FIG. 1. While shifting from highway to off-road mode, the vehicle operator first stops the vehicle. The operator then pushes a button in the vehicle interior, which actuates the shifting system in each hub assembly (although the shifting system can be actuated by hand outside of the vehicle or through a shifting lever inside the vehicle cab). Once actuated, air pressure is then applied to the piston 38, which pushes on the thrust ring or axial bearing 40. The force is transmitted through the first push rods 32 to the first shift ring 44, which contains the first tabs 46 that slide the first shift sleeve 48 over a portion of the ring gear 30 into an engaged position. Once in the engaged position, the first shift sleeve 48 locks the ring gear 30 to the spline 36. This allows the torque from the sun gear 24 to be transmitted through the main planet carrier 16 to the wheel 58.

For torque to be transmitted from the sun gear 24 through the main planet carrier 16 to the wheel 58, the second shift sleeve 54 must be disengaged first. As the first push rods 32 are acting on the first shift sleeve 48, the second push rods 34 are displacing the second shift ring 50 and its associated second tabs 52. The second tabs 52 cause the second shift sleeve 54 to move from the locking portion of the input member 22, thereby unlocking the main planet carrier 16. In the preferred embodiment, the gear reduction in the off-road mode is 3:1. A range of reductions is possible including approximately from 2.3:1 to 8:1.

Once the driver no longer desires to be in the off-road mode, the operator can shift the hubs back into highway mode. To do this, the operator must first stop the vehicle. The air pressure is then relieved from the piston ring 32. Once the air pressure is relieved, the return springs 56 force the thrust ring 40 to return to its initial position. As a result, the first push rods 32 are pulled back, which causes the first shift ring 44 and its associated first tabs 46 to pull back the first shift sleeve, thereby unlocking the ring gear 30 from the spline 36. Meanwhile, the second push rods 34 are also being pulled back, which causes the second shift ring 50 and the second tabs 52 to return the second shift sleeve 54 to its initial position—locked on the locking portion 60 of the input member 22. As a result, the main planetary carrier 16 is locked to the input member 22 and the system is back in direct drive.

As shown in FIGS. 2 through 5, a second embodiment of the invention includes a brake drum 12 of the wheel surrounding the housing 10. The brake drum 12 is connected to the wheel hub 14 through a brake drum stud 62 and a brake drum nut 64. A plurality of bolts 66 mount the end cap 18, the main planet carrier 16, and the wheel hub 14, as a single unit. A gasket 68 is located between the end cap 18 and the planet carrier 16 and between the planet carrier 16 and the wheel hub 14. Last, the wheel rim is mounted to the hub assembly with a plurality of rim studs 70.

At the end of the differential housing 10, there is a piston housing 42. An O-ring 72 is provided between the piston housing 42 and the differential housing 10. The piston housing 42 has a piston 38 and two O-rings 74,76, which ensure that the chamber between the piston 38 and the piston housing 42 is sealed. An axial bearing 40 is mounted to the piston 38. The axial bearing 40 is coupled to the inner shift rods 32 and the return springs 56. An air line 78 runs from the actuator to an air line fitting 80 provided at an inner side of the piston housing 42. The air line 78 supplies the air, or other fluid, for operating the piston 42.

Inner shift rods 32 are coupled to the axial bearing 40. An annular inner shift ring 44 is mounted to the inner shift rods 32. An inner shift plate 46 is fixed to the end of each of the inner shift rods 32. The inner shift plates 46 are attached to the inner shift ring 44 with a socket head cap screw 82. Another socket head cap screw 82 is inserted through each inner shift plate 46, through the inner shift ring 44, and into the inner shift rods 32 to securely fix the three pieces. Each inner shift plate 46 is coupled to the inner shift sleeve 48.

Outer shift rods 34 are connected to the inner shift ring 44. An outer shift ring 50 is mounted to the end of each of the outer shift rods 34 with socket head cap screws 82. At a radially inward position from the outer shift rods, outer shift plates 52 are fixed to the outer shift ring 50 with socket head cap screws 82. The outer shift plates 52 are coupled to the outer shift sleeve 54.

An inner wheel bearing 84 and an outer wheel bearing 86 are provided between the wheel hub 14 and the spindle 20, which surrounds the drive axle 22. An oil seal 88 is also preferably provided to seal the inner portions of the multi-speed wheel hub so that the inner parts are adequately lubricated.

A stationary spline 36 is secured to the spindle 20 via an inner spindle nut 90, a nut lock washer 92, and an outer spindle nut 94. A needle bearing 106 is mounted to an outer circumferential surface of the stationary spline 36. An annular snap ring 98 is provided at an outer portion of the stationary spline 36 to hold the needle bearing 106 in place. Two needle bearing thrust washers 100 are provided, one between the snap ring 98 and the needle bearing 106, and the other between the needle bearing 106 and the stationary spline 36.

Figure 2:
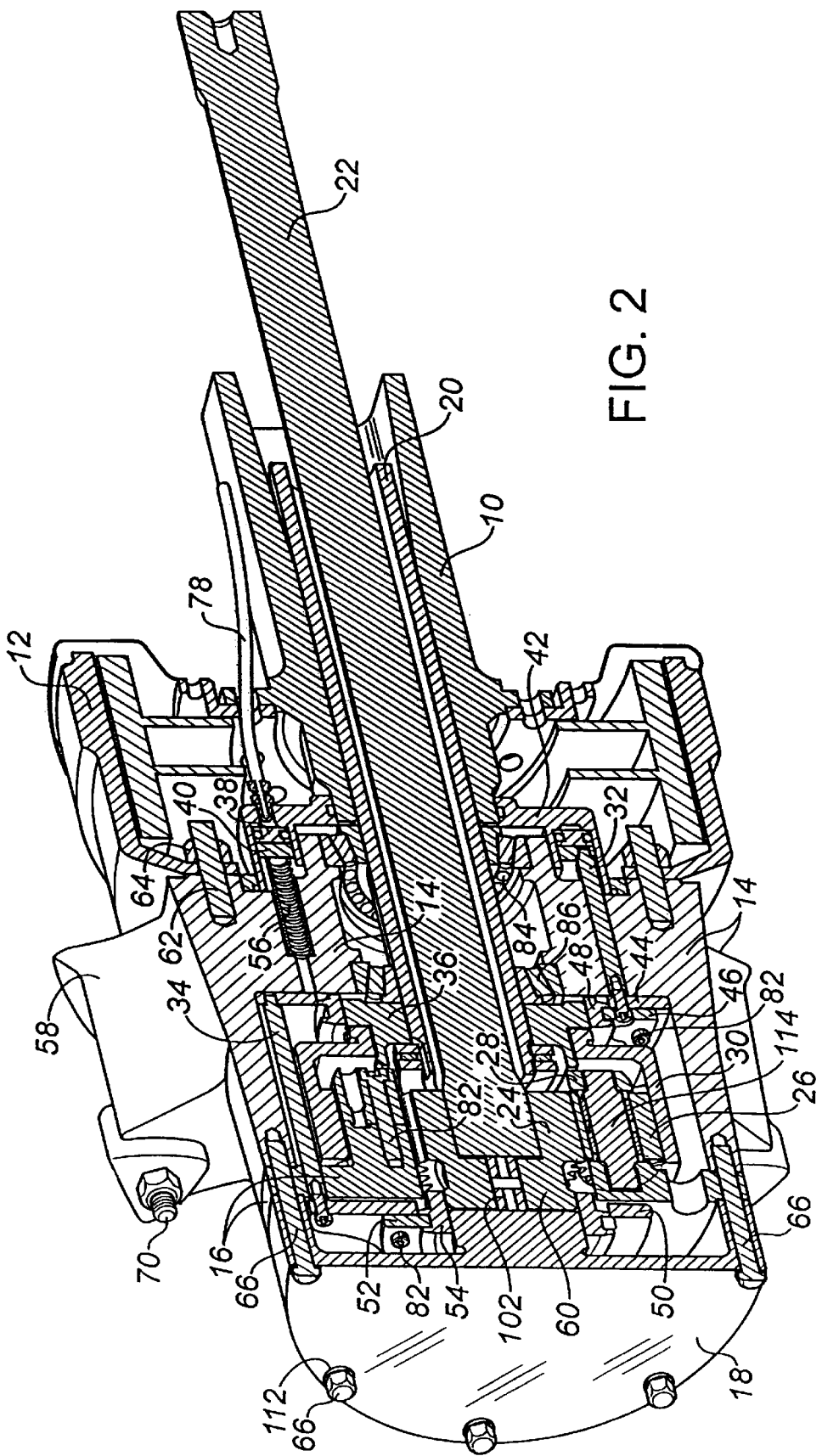
FIG. 2 is a sectioned perspective view of a second embodiment of the invention, which includes the line supplying the medium for operating the piston.

A sun gear 24 is fixed to the end of the drive shaft 22. As shown in FIG. 2, the sun gear is not formed integrally to the drive shaft 22. The sun gear also has a locking portion 60. Two bumpers 102 are provided in the interior of the locking portion 60 of the sun gear 24 between the end of the drive axle 22 and the outer shift sleeve 54.

Disposed about the sun gear 24 is a planetary gear set including the main planet carrier 16, the secondary planet carrier 28, and a plurality of planet gears 26. Large socket head cap screws are used to fix the secondary planet carrier 28 to the main planet carrier 16. Planet pins 114 mount each of the planet gears 26 to the secondary planet carrier 28. Needle bearings 106 are provided between each of the planet gears 26 and the planet pins 114 to allow the planet gears 26 to rotate about the axis of the planet pins 114. Planet thrust washers 108 are provided between each of the planet gears 26 and the main planet carrier 16 and between each of the planet gears 26 and the secondary planet carrier 28.

Disposed about the periphery of the planet gears 26 is a ring gear 30. The ring gear 30 is also rotatably mounted to the circumference of the stationary spline 36. A needle bearing 106 is located between the circumferential surface of the stationary spline 36 from the ring gear 30. Two ring gear thrust washers 110 are provided, one between the snap ring 98 and the ring gear 30 and the other between the ring gear 30 and the stationary spline 36.

Figure 3:
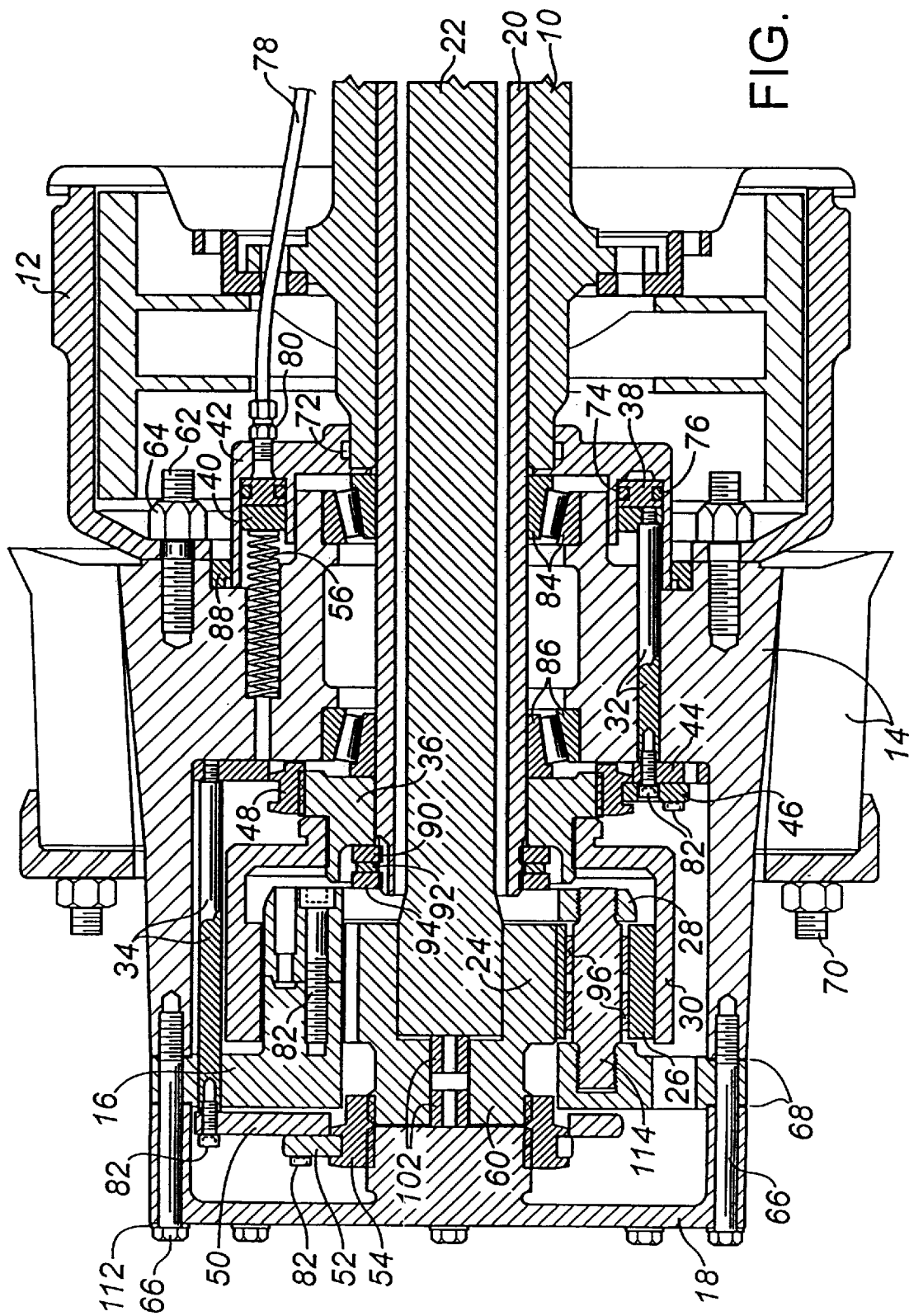
FIG. 3 is a side sectioned view of the second embodiment of FIG. 2 in the direct drive, or highway, mode.

In the highway, or direct drive, mode shown in FIG. 3, the drive axle 22 rotates. As shown, the outer shift sleeve 54 is in an inward position over the locking portion 60, thereby locking the end cap 18 to the sun gear 24, which is fixed to the end of the drive axle 22. The sun gear 24, ring gear 30 and planet gears 26 rotate as a unit without any gear reduction. Accordingly, the drive axle 22 drives the wheel hub 14, which has the wheel attached, at a 1:1 ratio.

Figure 4:
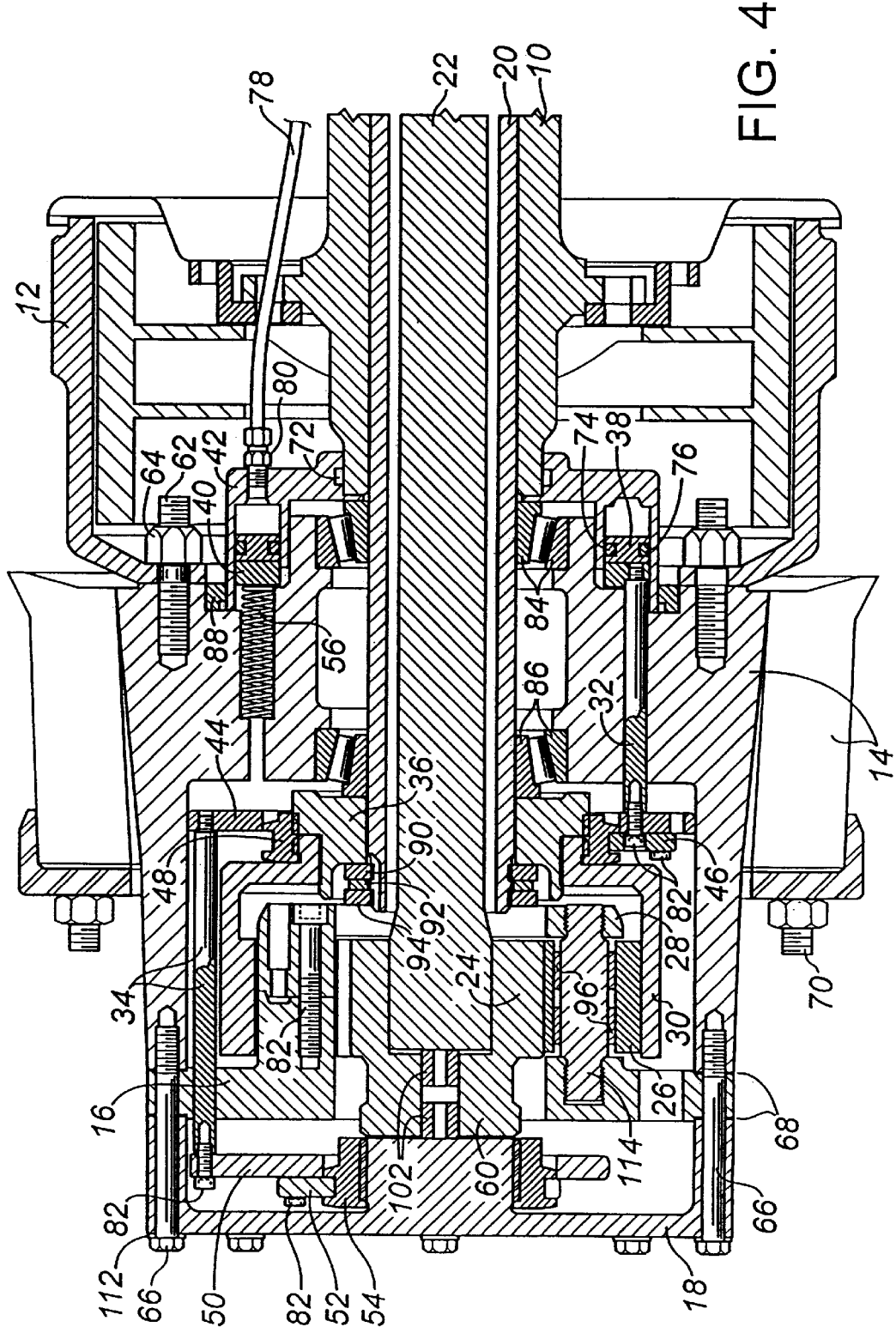
FIG. 4 is a side sectioned view of the second embodiment of FIG. 2 in the off-road, or gear reduced, mode.
Figure 5:
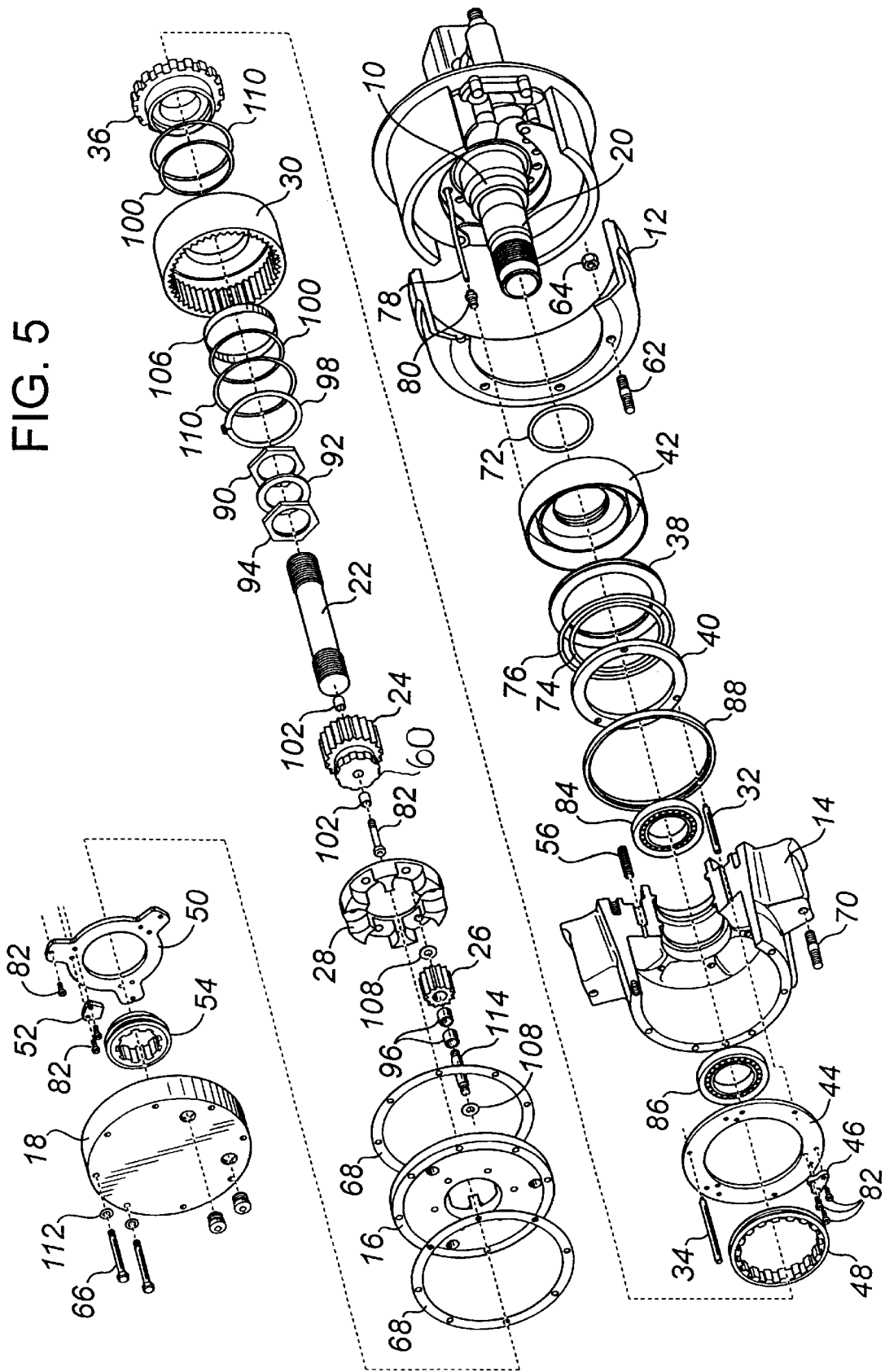
FIG. 5 is an exploded view of the second embodiment of FIG. 2.

The driver, once the off-road mode of FIG. 4 is desired, actuates the control. Air (or oil or fluid if a hydraulic piston is used) is sent through the air line 78. The air pressure from the air line 78 actuates the piston 38 in the piston housing 42. The piston 38 moves outward, thereby pushing the axial bearing 40 away from the housing 10. In turn, the inner shift rods 32 are moved outward, thereby moving the inner shift ring 44 and inner shift plates 46 over the neck of the ring gear 30 and locking the ring gear 30 to the stationary spline 36.

Also as a result of the inner shift rods 32 and inner shift ring 44 being moved outward, the outer shift rods 34 are moved outward. Due to this outward movement, the outer shift ring 50, outer shift plates 52, and outer shift sleeve 54 are moved outward, thereby unlocking the end cap 18 from the drive axle 22.

In this case, the rotating drive axle 22 causes the sun gear 24 to rotate. The rotation of the sun gear 24 causes the planet gears 26 to rotate on the inside of the ring gear 30, which is fixed to the stationary spline 36. Because the end cap 18 is unlocked from the drive axle 22, the end cap 18 also does not rotate directly via shaft 22, but rather by the main planet carrier 16. Accordingly, as the planet gears 26 rotate about their individual axes, the planet gears 26 cause the main planet carrier 16 to rotate, which then causes the wheel hub 14 to rotate.

When the driver needs highway mode, pressure is relieved from the air line 78 and the piston housing 42. As a result, the return spring 56, which is braced in a hole in the wheel hub 14, presses against the axial bearing 40. The axial bearing 40 and the piston 38 return to their respective initial inward positions. The inner shift rods 32 are pulled inward thereby unlocking the inner shift sleeve 48 from the ring gear 30. Also, the outer shift sleeve 54 returns to its initial position locked to the wheel axle 22.

In the preferred embodiments, the drive axle is supported in only two places, the hub end and the differential end. At the hub end, the drive axle is supported by the sun gear, which is supported and centralized by the planet gears of the planet carrier. At the differential end, the drive axle is supported and centralized by the compensating gear in the differential. There is not a bearing supporting the drive axle directly in the differential housing. A compensating gear inside the differential, which is supported by the bearings, supports the drive axle.

The piston preferably is contained in a cylinder that is rigidly attached to the differential housing. Preferably, the cylinder is removable from the differential housing. The ability to remove the cylinder allows the brakes to be serviced. It is possible to mold the piston cylinder and the differential housing as a single integral piece, but the brakes may not be able to be serviced.

One advantage of using the return spring 56 to return the piston to an initial position, is that even if the system fails or pressure is lost, the system will default to the highway mode, that is, there is a failsafe. There are alternatives, in addition to the return spring 56, for returning the piston to its initial position, including a dual acting cylinder, which may be suitable but the failsafe is lost; mechanically via cams and linkages; or manually.

The components of the multi-speed wheel hub are preferably lubricated by an oil bath, which is at a level that allows oil to flow to and from the differential through an opening between the drive axle and the differential housing.

With respect to the dual shifting sleeve assembly of the preferred embodiments, there is an equivalent structure for coupling and uncoupling the components. It is possible to use two sets of multiple wet disks. This option works well and may be preferred in applications requiring lower torque.

With respect to the known non-planetary gear systems, which require extreme care when pulling a heavy load due to the ease in which parts break, the known system reduces the loads on the drive axle and differential are reduced by a factor of the gear reduction, i.e., if the planetary gear has a ratio of three, the loads on the differential, drive shaft, and other drive train components are reduced by a factor of three. This is very desirable when moving heavy loads at slow speeds.

Some manufacturers have compensated by increasing horsepower and installing larger drive shafts, differentials, and other drive components. Manufacturers are trying to provide an axle of great strength while being able to provide the required speed. These solutions add both weight and cost to the assembly. With the inventive multi-speed wheel hub, manufactures will be able to install smaller components.

With respect to known planetary gear alternatives, which employ planetary gear sets that large amounts of heat due to the constantly moving planet gears, manufacturers currently compensate by using "high speed planetary axles" made from extremely accurate gears and then use an expensive cooling system for cooling the oil used to lubricate the parts. Problems are encountered because of the shorter life of the planetary gear units and the high cost of repairing them. Moreover, when travelling at highway speeds, a large amount of pull is not required, as compared to travelling offroad when drivers frequently encounter soft ground, steep slopes, and the like. With the inventive multi-speed wheel hub, once a large amount of pull is no longer required, the driver may lock-up the planet gears and drive at a 1:1 ratio, thereby generating highway speeds without running the planet gears and generating heat.

After reading and understanding the foregoing invention multi-speed wheel hub, in conjunction with the drawings, it will be appreciated that several distinct advantages of the subject invention are obtained. For example, the multi-speed wheel hub has several advantages over the known hub in which there is no planetary gear. The present invention allows for the driver of the vehicle to shift into a lower gear to allow for smoother, slower acceleration. Moreover, as disclosed in the first embodiment, only one-third of the torque at the wheels is transmitted through the drive train, thus the life of the various drive train components is greatly prolonged. The other two-thirds of the torque at the wheel is transmitted through the spindle and differential housing.

As compared with the known system in which the planetary gear unit is always in use, the planet gears of the inventive multi-speed wheel hub are locked during highway applications. Accordingly, the planet gears of the invention do not rotate while the vehicle is driven at highway speeds and thus do not generate heat. As a result, lower cost gears and bearings can be used in the inventive multi-speed wheel hub. Moreover, the current invention does not need a costly cooling system, thereby reducing the cost.

With respect to the two-speed high shift transmission, the inventive multi-speed wheel hub allows for a direct drive ratio (1:1). Moreover, the inventive multi-speed wheel hub has far fewer parts, which will reduce the manufacturing cost and the likelihood that components will fail.

Additional advantages and modifications of the invention will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-speed wheel hub comprising:
   a housing;
   an input member, including a sun gear, disposed in the housing;
   a planet carrier, including a plurality of planet gears, disposed about the sun gear;
   a ring gear disposed about the planet gears; and
   a shifting system including:
      a piston;
      a first shift ring mechanically coupled to the piston by a plurality of first push rods; and
      a second shift ring mechanically coupled to the first shift ring by a plurality of second push rods,
      wherein the piston activates the first and second shift rings;
   wherein, when the first shift ring is engaged and the second shift ring is disengaged, the ring gear is locked to the housing so that a torque is transmitted from the sun gear through the planet carrier to a wheel, and
   wherein, when the first shift ring is disengaged and the second shift ring is engaged, the ring gear is unlocked from the housing and the housing is locked to the input member so that torque is transmitted from the sun gear to the wheel.

2. A multi-speed wheel hub as claimed in claim 1, wherein the shifting system further includes at least one spring between the first shift ring and the housing for biasing the piston into an initial position.

3. A multi-speed wheel hub as claimed in claim 1, wherein the shifting system further includes a first shift sleeve coupled to the first shift ring and a second shift sleeve coupled to the second shift ring.

4. A multi-speed wheel hub as claimed in claim 3, wherein the shifting system further includes at least one first shift tab for coupling the first shift sleeve to the first shift ring and at least one second shift tab for coupling the second shift sleeve to the second shift ring.

5. A multi-speed wheel hub as claimed in claim 1, wherein the piston is a ring piston.

6. A multi-speed wheel hub as claimed in claim 1, wherein the piston is pneumatically actuated.

7. A multi-speed wheel hub as claimed in claim 1, wherein the piston is hydraulically actuated.

8. A multi-speed wheel hub as claimed in claim 1, wherein a gear reduction is in the range of 2.3:1 to 8:1.

9. A multi-speed wheel hub as claimed in claim 8, wherein the gear reduction is 3: 1.

10. A multi-speed wheel hub comprising:
    a housing;
    an input member, including a sun gear, disposed in the housing;
    a planet carrier, including a plurality of planet gears, disposed about the sun gear;
    a ring gear disposed about the planet gears;
    axially displaceable first and second shift rings; and
    means for shifting the first and second shift rings,
    wherein, when the first shift ring is engaged and the second shift ring is disengaged, the ring gear is locked to the housing so that a torque is transmitted from the sun gear through the planet carrier to a wheel, and
    wherein, when the first shift ring is disengaged and the second shift ring is engaged, the ring gear is unlocked from the housing and the planet carrier is locked to the input member so that torque is transmitted from the sun gear to the wheel.

11. A multi-speed wheel hub comprising:
    a housing including an end cap, a main planet carrier, and a hub;
    a sun gear disposed in the housing and adapted for mounting to an input member;
    a plurality of planet gears rotatably fixed to the main planet carrier and disposed about the sun gear;
    a ring gear disposed about the planet gears; and
    a shifting system including:
        a piston;
        a first axially displaceable shift ring coupled to the piston; and
        a second axially displaceable shift ring coupled to the first shift ring,
        wherein the piston axially displaces the first and second shift rings;
    wherein, when the first shift ring is engaged and the second shift ring is disengaged, the ring gear is locked to the housing so that a torque is transmitted from the sun gear through the planet carrier to a wheel, and
    wherein, when the first shift ring is disengaged and the second shift ring is engaged, the ring gear is unlocked from the housing and the housing is locked to the input member so that torque is transmitted from the sun gear to the wheel.

12. A drive train for an automotive vehicle comprising:
    a differential having a housing;
    a drive axle partially disposed in the differential housing and coupled at a first end to the differential;
    a hub coupled to a second end of the drive axle;
    a brake drum mounted to the hub;
    a main planet carrier mounted to the hub;
    an end cap mounted to the main planet carrier;
    a sun gear mounted to the drive axle;
    a plurality of planet gears rotatably fixed to the main planet carrier and disposed about the sun gear;
    a ring gear disposed about the planet gears; and
    a shifting system including:
        a piston;
        a first axially displaceable shift ring coupled to the piston; and
        a second axially displaceable shift ring coupled to the first shift ring,
        wherein the piston axially displaces the first and second shift rings;
    wherein, when the first shift ring is engaged and the second shift ring is disengaged, the ring gear is locked to the housing so that a torque is transmitted from the sun gear through the planet carrier to a wheel, and
    wherein, when the first shift ring is disengaged and the second shift ring is engaged, the ring gear is unlocked from the housing and the housing is locked to the input member so that torque is transmitted from the sun gear to the wheel.

13. A multi-speed wheel hub comprising:
    a housing;
    an input member, including a sun gear, disposed in the housing;
    a planet carrier, including a plurality of planet gears, disposed in the housing about the sun gear, the planet carrier being fixed to the housing;
    a ring gear in the housing disposed about the planet gears;
    ring gear locking means for locking the ring gear to the housing;
    input member locking means for locking the input member to the housing;
    means for simultaneously actuating the ring gear locking means and the input member locking means so that when one of said locking means is locked the other of said locking means is unlocked, and vice versa,
    whereby when the ring gear is locked to the housing and the input member is unlocked from the housing torque is transmitted from the sun gear through the planet carrier to the housing, and
    whereby when the input member is locked to the housing and the ring gear is unlocked from the housing torque is transmitted from the input member to the housing.

14. A multi-speed wheel hub as claimed in claim 13, wherein the housing comprises an end cap, the input mem ber locking means comprises a locking portion at the end of the input member adjacent the sun gear and a locking portion on the end cap adjacent the input member locking portion, and said locking portions are adapted to be selectively locked and unlocked.

15. A multi-speed wheel hub as claimed in claim 14, wherein the end cap locking portion and the input member locking portion comprise axially aligned splined projections of the same diameter, and the input member locking means further comprises an axially displaceable splined shift ring carried by one of said splined projections and axially movable into and out of engagement with the other of said splined projections.

16. A multi-speed wheel hub as claimed in claim 15, wherein said shift ring is carried by the splined projection on the end cap.

* * * * *